United States Patent [19]
Köhler et al.

[11] Patent Number: 5,124,382
[45] Date of Patent: Jun. 23, 1992

[54] BLENDS OF POLYARYLENE SULFIDES, EPOXIDES, ANHYDRIDES, GLASS FIBERS AND OPTIONALLY OTHER FILLERS

[75] Inventors: Burkhard Köhler; Wolfgang Wehnert, both of Krefeld; Walter Uerdingen, Leverkusen; Joachim Franke, Cologne, all of Fed. Rep. of Germany

[73] Assignee: Bayer Aktiengesellschaft, Leverkusen, Fed. Rep. of Germany

[21] Appl. No.: 664,096

[22] Filed: Mar. 4, 1991

[30] Foreign Application Priority Data

Mar. 22, 1990 [DE] Fed. Rep. of Germany ....... 4009179

[51] Int. Cl.$^5$ ............................ C08K 5/15; C08K 5/09
[52] U.S. Cl. .................................... 524/114; 524/110; 524/112; 524/494
[58] Field of Search ................ 524/110, 114, 112, 494

[56] References Cited

U.S. PATENT DOCUMENTS 4,996,256  2/1991  Heinz et al. ......................... 524/112

FOREIGN PATENT DOCUMENTS 3837647  5/1990  Fed. Rep. of Germany .

Primary Examiner—Paul R. Michl
Assistant Examiner—Tae H. Yoon
Attorney, Agent, or Firm—Connolly & Hutz

[57] ABSTRACT

The invention relates to blends of polyarylene sulfides, epoxides, anhydrides, glass fibers and optionally other fillers. The blends are distinguished by good mechanical properties.

2 Claims, No Drawings

BLENDS OF POLYARYLENE SULFIDES, EPOXIDES, ANHYDRIDES, GLASS FIBERS AND OPTIONALLY OTHER FILLERS

This invention relates to blends of polyarylene sulfides, epoxides, anhydrides, glass fibers and optionally other fillers/additives. The blends according to the invention are distinguished by good mechanical properties.

Polyarylene sulfides (PAS) are known (cf. for example US-A 3,354,129, EP-A 171 021). They are inert, high-temperature-resistant thermoplastics which can be filled to high levels, for example with glass fibers and/or other inorganic fillers. These polymers, particularly polyphenylene sulfide (PPS), are being used to an increasing extent in fields hitherto reserved for thermosets.

PAS has unsatisfactory mechanical properties for certain applications in the injection molding field. In particular, outer fiber strain and impact strength are unsatisfactory for practical purposes. Accordingly, it has been found to be an advantage to improve the above-mentioned properties of PAS, for example by blending with other thermoplastics, for example blends of maleic-anhydride-grafted hydrogenated diene rubbers, epoxides and PAS (cf. for example JP-A 63-118 369). The large quantities in which the maleic-anhydride-grafted polyolefins of low glass temperature are used may improve toughness, but do not enable flexural strength to be significantly increased.

For certain applications, however, the property spectrum of blends of the type in question is not always entirely satisfactory.

It has now been found that blends of polyarylene sulfide (PAS) with epoxides, anhydrides, glass fibers and optionally other additives are distinguished by their mechanical properties.

Accordingly, the present invention relates to blends of

A) 89.9 to 20% by weight polyarylene sulfides, preferably polyphenylene sulfide (PPS), B) 0.1 to 35% by weight and preferably 0.2 to 5% by weight of an epoxide corresponding to formula (I)

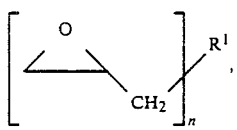

in which

R$^1$ is an at least difunctional organic, open-chain aliphatic radical containing 1 to 24 C atoms or a cyclic aliphatic radical containing 3 to 14 C atoms, an aromatic radical containing 6 to 24 C atoms, a heterocyclic radical containing up to 3 nitrogen atoms and up to one oxygen atom (these structural elements may combined in the substituent R$^1$) which is attached to the glycidyl unit by an oxygen or nitrogen atom and n is a number of or greater than 2, preferably the number 2 or 3, C) 0.01 to 2% by weight and preferably 0.1 to 1% by weight of an anhydride corresponding to formula (II)

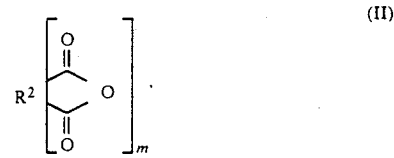

in which

R$^2$ is a C$_{6-14}$ cycloaliphatic or C$_{6-24}$ aromatic radical, preferably a C$_{6-24}$ aromatic radical and m is the number 1, 2, 3 or 4, preferably 2, D) 10 to 79.9% by weight and preferably 30 to 60% weight glass fibers preferably sized with polyurethane film formers and aminosilane or epoxysilane coupling agents, more preferably with aminosilane coupling agents, and optionally up to 300% by weight, based on PAS, of other mineral or organic fillers and reinforcing materials and/or inorganic or organic auxiliaries.

Examples of epoxides of formula (I) according to the invention are bisglycidyl bisphenol A, bisglycidyl terephthalate, bisglycidyl tetrahydrophthalate, triglycidyl isocyanurate, triglycidyl urazole, glycidyl ethers of phenolformaldehyde condensates.

The epoxides used are known and are even commercially available (for example Lekutherm ®), for example Rompps Chemie Lexikon, Vol. 2, page 1158, 8th Edition, Franck'sche Verlagshandlung, Stuttgart 1981, and the literature cited therein.

The anhydrides of formula (II) are known and are even commercially available (for example benzophenonetetracarboxylic dianhydride), Chemie (INZ or Aldrich, Catalog 1988–89, Order No. 26, 246–3).

Commercially available glass fibers optionally sized with polyurethane film formers and aminosilane or epoxysilane coupling agents are used in accordance with the invention. They have a diameter of 1 to 20 μm and preferably 5 to 13 μm. It is also possible to use endless glass fibers (rovings) and/or production processes in which the length of the fibers in the final blend is from 0.05 to 10 mm and preferably from 0.1 to 2 mm. It is also possible to use rovings in processes for the production of roving-reinforced unidirectional composites.

The glass fibers may even be replaced, more particularly in part, by commercially available glass beads, for example Ballotini glass beads.

Other suitable mineral fillers or additives are mica, talcum, silica flour, metal oxides and sulfides such as, for example, TiO$_2$, ZnO, ZnS, graphite, carbon black, fibers, for example of quartz or carbon, carbonates such as, for example, MgCO$_3$, CaCO$_3$, or sulfate, such as for example CaSO$_4$, BaSO$_4$.

Other standard additives which may be used in accordance with the invention include pigments, mold release agents, E waxes, flow aids, nucleating agents or stabilizers.

The fillers and additives may be used in a quantity of 0 to 300% by weight, based on PAS, fillers and additives.

The blends according to the invention may be produced in the usual way by extrusion.

The blends according to the invention may be processed in the usual way to moldings, semifinished products, circuit boards, fibers, films, profiles, etc. The blends according to the invention may generally be used with advantage for applications for which thermoplastics are typically used.

EXAMPLES

The blends according to the invention were prepared at 320° C. in Werner & Pfleiderer ZSK 32 twin-screw extruder.

The PPS used had a melt viscosity of 45 Pa.s (306° C.), shear stress = 1,000 1/s, and had been produced in accordance with EP-A 171 021.

Chopped strands (CS 7916®, a product of Bayer AG) sized with polyurethane film former and aminosilane coupling agents were used as the glass fibers in a quantity of 40% by weight.

The blends were granulated and injection molded to test specimens (for example measuring 80×10×4 mm). The test specimens were tested for flexural strength, outer fiber strain, flexural modulus and impact strength $a_n$ (reversed notched ISO 180).

COMPARISON EXAMPLE

60% PPS was blended with 40% glass fibers.

EXAMPLE 1

59% PPS was blended with 40% glass fibers, 0.5% triglycidyl isocyanurate and 0.5% benzophenone tetracarboxylic dianhydride.

EXAMPLE 2

58% PPS was blended with 40% glass fibers, 1.5% triglycidyl isocyanurate and 0.5% benzophenone tetracarboxylic dianhydride.

The mechanical properties are shown in the following Table:

| Example | Flexural strength (MPa) | Outer fiber strain (%) | Flexural modulus (MPa) | Izod notched strength (kJ/m²) |
|---|---|---|---|---|
| Comparison | 250 | 1.9 | 13,000 | 30 |
| 1 | 308 | 2.4 | 13,100 | 44 |
| 2 | 304 | 2.6 | 12,500 | 44 |

We claim:
1. Blends of
A) 89.9 to 20% by weight polyarylene sulfides,
B) 0.1 to 35% by weight of an epoxide corresponding to formula (I)

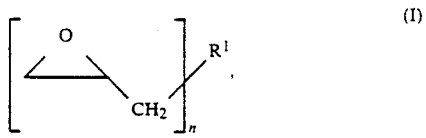

in which
R¹ is an at least divalent organic radical attached to the glycidyl unit by an oxygen or nitrogen atom and
n is an integer 2 or 3,
C) 0.01 to 2% by weight of an anhydride corresponding to formula (II)

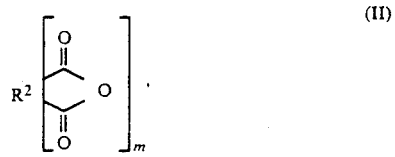

in which
R² is a $C_{6-14}$ cycloaliphatic or $C_{6-24}$ aromatic radical and
m is the number 1, 2, 3 or 4,
D) 10 to 79.9% by weight glass fibers and optionally other mineral or organic fillers and reinforcing materials and/or inorganic or organic auxiliaries.
2. Polymeric molding composition containing the blend claimed in claim 1.

* * * * *